Aug. 31, 1926.
M. MALLORY
IGNITION SYSTEM
Filed May 16, 1924    2 Sheets-Sheet 1
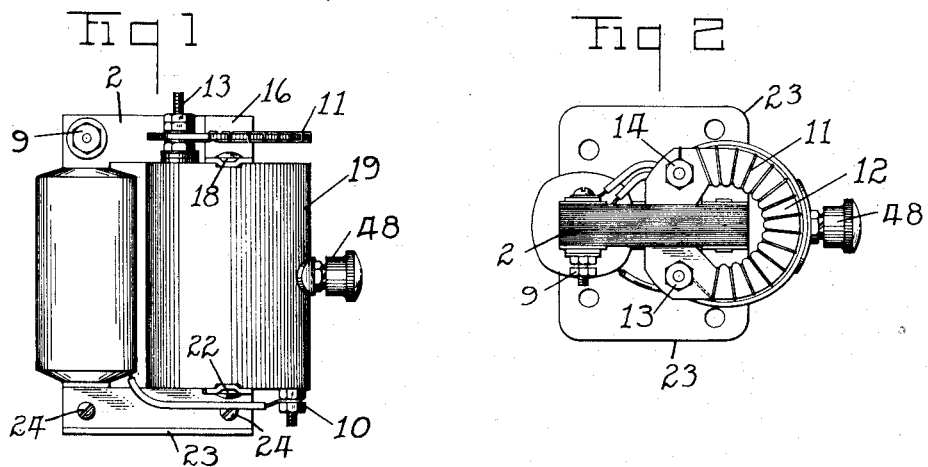
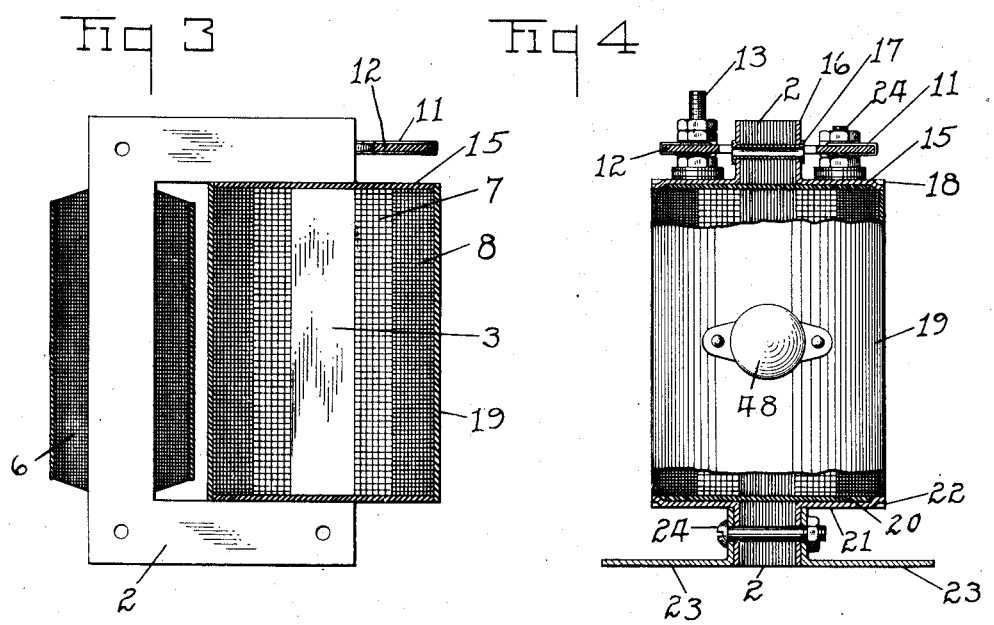
Inventor
Marion Mallory
By Owen, Owen & Crampton
Attorney Aug. 31, 1926.
M. MALLORY
1,598,486
IGNITION SYSTEM
Filed May 16, 1924    2 Sheets-Sheet 2
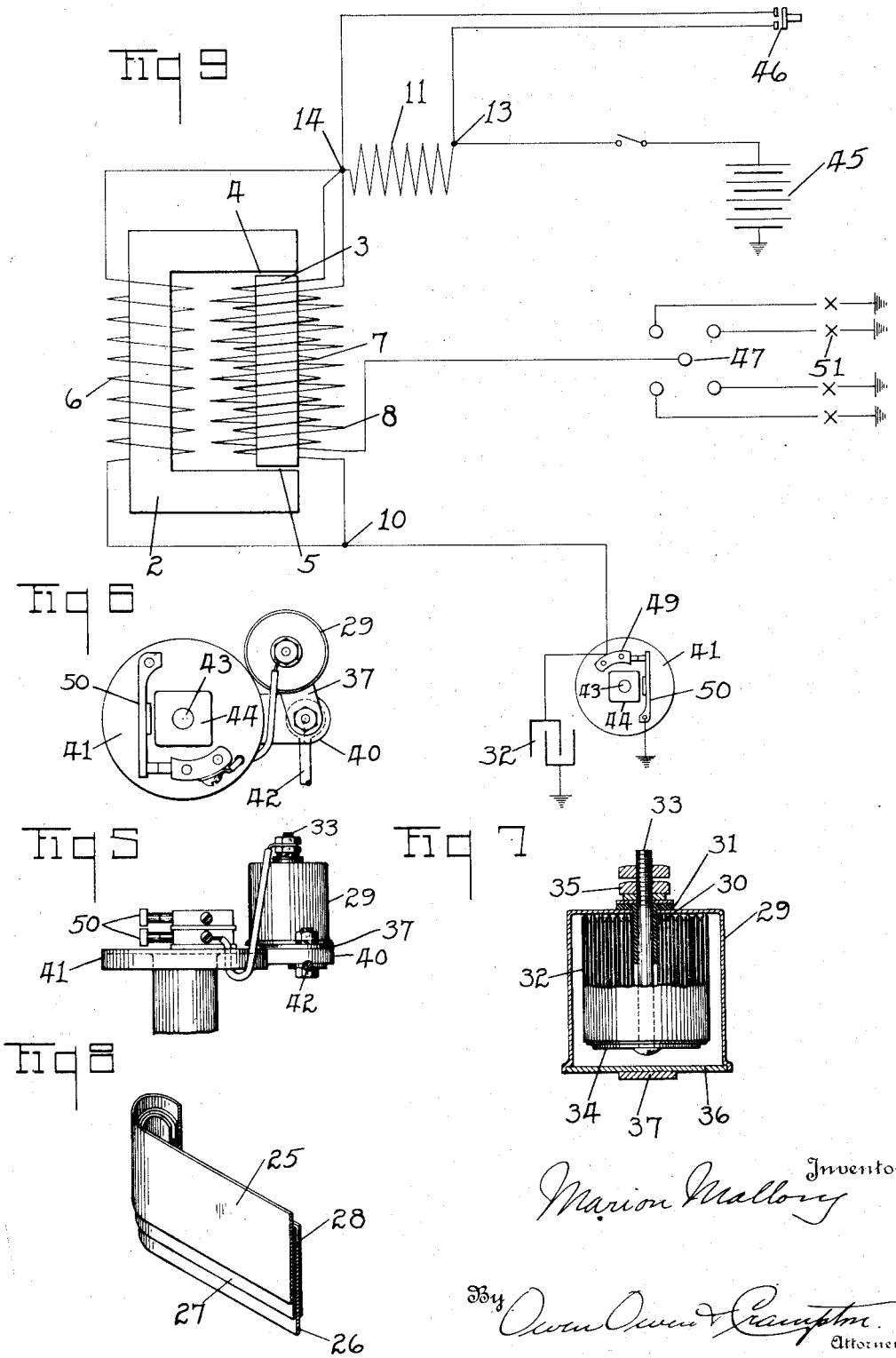

Patented Aug. 31, 1926.

1,598,486

UNITED STATES PATENT OFFICE.

MARION MALLORY, OF TOLEDO, OHIO, ASSIGNOR TO THE MALLORY ELECTRIC CORPORATION, OF TOLEDO, OHIO, A CORPORATION OF OHIO.

IGNITION SYSTEM.

Application filed May 16, 1924. Serial No. 713,665.

My invention has for its object to provide an induction coil for internal combustion engines, that is so constructed and connected in the ignition system that exceedingly hot arcing flames will be produced at the electrodes of the spark plugs at all possible speeds of the engine. The invention also has for its object certain details of construction in the parts of the ignition system. Thus by my invention I have provided a novel form of induction coil and a novel form of condenser, and means for supporting the condenser in conjunction with the timer of the ignition system, whereby the terminals of the condenser may be readily connected to the timer.

As is well known in the art, the closing of a circuit through a coil develops a counter electromotive force that requires a considerable period of time to be overcome by the potential of the source of current supplied to the coil, and where the make and break increases in rapidity, this effective counter-electromotive force will be maintained so that the current flow from the source will decrease until the flow is practically nil, with the result that the magnetic flux cannot be materially built up in the core. This prevents the utilization of the exceedingly high potential of the secondary coil that occurs at the break of the circuit in the primary coil, when the primary circuit is rapidly broken. Thus, in the interim between the succeeding breaks, sufficient lines of force cannot be established within the coil to meet the requirements necessary for the proper ignition of an engine, with the result that the efficiency of the coil varies from maximum at low speed to zero before the engine reaches a high speed. By my invention hot arcing flames are produced at maximum speed of the engine as well as at low speed, that is, at a high rate of circuit-breaking as well as at a low rate.

The invention may be contained in ignition systems which in their details may vary. To illustrate a practical application of the invention, I have selected an induction coil and system embodying the invention and shall describe it hereinafter. The induction coil and system selected for purposes of illustration are shown in the accompanying drawings.

Figure 1 illustrates a side view of the induction coil. Figure 2 illustrates a top view of the induction coil. Figure 3 illustrates a vertical section of the induction coil. Figure 4 illustrates an end view. Figure 5 is a side view of the condenser and the timer. Figure 6 is a top view of the condenser and the timer. Figure 7 is a sectional view of the condenser, the thickness of the plates or strips of the condenser being shown greatly enlarged on account of limitations of the drawing. Figure 8 illustrates the manner in which the condenser shown in Figs. 5 and 6 is formed. Figure 9 is a diagrammatic illustration of the system in which the induction coil and the condenser are connected.

The induction coil comprises two laminated cores. One core part 2 is U-shaped and the other core part 3 is I-shaped. The core part 3 is located between the ends of the core 2. The core parts 2 and 3 are so located as to form two gaps 4 and 5. The induction coil is provided with two primary coils 6 and 7. The coil 6 is located on the core part 2, while the coil 7 is located on the core 3. The number of windings in the two coils is about the same but the ratio of the resistances of coils 6 and 7 are as 3 is to 2. The secondary 8 surrounds the coil 7 and has the required windings such as 20 of the secondary to 1 of the two primaries. The two primary coils 6 and 7 are connected in parallel, both being connected to the terminals 9 and 10, while the secondary coil is connected in the ignition circuit.

A resistance wire 11 is connected in series with the primaries and normally in the circuit of the primary coils, but may be short-circuited by means of a suitable switch during the starting operations of the electric starter, as hereinafter described. During this period, the potential falls by reason of the current passing through the starter, and in order to maintain the required current quantity in the coils, the resistance wire 11 is short-circuited. When, however, the engine is running, the potential is increased, and to maintain the required current quantity, the current is directed through the resistance 11 to prevent a large current flow. The resistance 11 is located on a mica ring 12 that is supported on the two binding posts 13 and 14, located on the end of the enclosing shell of the coil. The mica ring 12 is made of a layer or of layers of mica and substantially conforms with the top of the secondary coil 8, and is located above and in spaced relation with the upper end of the secondary coil. The ring 12 straddles one end of the core part 2 and provides a convenient means for supporting the resistance element.

The binding posts 13 and 14 are supported on a disc 15 of insulating material which covers the upper ends of the primary and secondary coils 7 and 8 and the core part 3. The disc 15 is held in position, and consequently the core part 3, the primary coil 7, and the secondary coil 8, are held in position, by means of sheet metal strips 16 that are bent angularly and securely riveted to the core part 2 by means of the rivets 17. The ends of the strips 16 are pressed down over opposite side edge portions of the disc 15 and into recesses 18 formed in the shell 19 of insulating material that surrounds the secondary coil 8.

A disc 20, similar in form to the disc 15, is located at the lower ends of the core part 3, the coil 7 and the coil 8, and closes the lower end of the shell 19. It is also secured in position in the same manner as the disc 15 is secured in position, that is, strips 21 are bolted to the part 2 of the core and are provided with raised portions that engage opposite side edge portions of the disc 20 and also the shell 19, recesses 22 being formed in the edge of the shell into which the raised portions of the ends of the strips 21 enter. Thus the part 3 of the core, the primary coil 7 and the induction coil 8 are securely fastened in position between the ends of the U-core 2, and the gaps 4 and 5 are maintained. These gaps are preferably about one-sixteenth of an inch, which is also the thickness of the discs 15 and 20.

A suitable standard may be formed by means of a pair of sheet metal angular parts 23 which may be secured to the part 2 of the core by means of the bolts 24. One of the bolts 24 may be also used to secure the angular pieces 21 that secure the disc 20 in position with reference to the shell 19.

The condenser is so formed that it may me mounted on the timer arm and thus readily connected to the circuit breaker of the timer. The condenser is formed of two strips of foil 25 and 26 that are separated from each other by a thin strip of insulating material 27. A second layer of insulating material 28 may be placed on the upper strip of foil and then the strips may be rolled together so as to form a roll of the closely positioned strips of foil separated by the insulating strips. The upper edge of the strip 25 is folded over so as to make a common contact between the portions or convolutions of the roll. The same is true with reference to the lower edge of the strip 26. A cup 29 is provided with an insulating sleeve 30 having an insulating flange 31. The condenser roll 32 is located in the cup 29 and on the sleeve 30. A bolt 33 having a large washer 34 is inserted through the roll and through the sleeve 31. Thus the roll is clamped in position on the bolt 33 by means of suitable nuts 35. The cup 29 is closed by a suitable disc 36 that may be welded or soldered to the edge of the cup 29 to seal and firmly secure the disc 36 to the cup 29. The container thus formed is provided with an arm 37 that is preferably connected to the disc 36. The arm 37 provides a convenient means for connecting the condenser to the arm 40 of the timer 41, and the bolt 33 affords a binding post for electrical connection with the timer.

The timer 41 is of the usual form and is operated or adjusted in its position by means of the link 42 that is connected to a suitable lever located in position convenient to the operation of the automobile driver, such as on the steering post. The timer is provided with a shaft 43 that is connected with the engine shaft to produce the proper ratio in the speeds of the two shafts. A cam 44 is provided with four or six points according to the number of cylinders of the engine, and so as to make and break the ignition circuit at the proper times in the cycles of the operation of the engine.

The ignition system is connected to the battery 45, the terminal 13 of the resistance coil 11 being connected to the battery 45. The terminals of the resistance 11 are connected to the switch 46 whereby the resistance 11 may be short-circuited so as to connect the primary coils directly to the battery and to obtain from the battery the required amount of current for the proper operation of the coil when the current from the battery is also being used in starting the engine, and to produce in the circuit of the coils some resistance to prevent the flow of too great a quantity of current after the engine has been started. This protects the coils from over-heating to a certain extent. The fixed contact 49 of the timer is connected to the terminal 10 and consequently to the primary coils 6 and 7. The condenser 32 is connected to the fixed contact 49 of the timer. The primary coil 8 is connected to the terminal 14 and to the rotating contact of the distributor 47. The terminal 48 of the primary coil 8 may be supported on the shell 19 and connection thus readily made with the distributor 47. The movable contact 50 of the timer 49, the battery 45, the condenser 32 and the spark plugs 51, are connected to the ground, that is, to the frame or engine of the automobile.

In the operation, the timer closes the circuit and then opens it, while the distributor is connected to the spark plug of the cylinder of the engine, wherein the charge of air and gasoline has been compressed according to the cycle of operation of the engine, in the manner well known in the art. The two coils 6 and 7 divide the current and thus reduce the heating effect. One of the primaries, that is, primary 7, being located on a comparatively small core, does not produce as great a self-induction as the other primary, and the position to the building up of the current in the primary 7, when the circuit is closed, is therefore not as great as in the case of the primary 6, because the gaps permit leakage of the lines of force while the primary 6 has a relatively large amount of iron in its core and the core part 3 is so located as to prevent a material amount of leakage of its lines of force, and consequently, at low speeds the primary 6, having a high self-induction, produces a hot arching flame, while at high speeds the current which is now reduced in the primary 6, in greater part passes through the primary 7, and since the core of the primary 7 is relatively small, its self-induction is small and consequently it will produce at the plugs of the ignition circuit the hot arcing flames at high speeds of the engine.

I claim:—

1. In an induction coil, a pair of primary coils connected in parallel and located on separate core parts separated by a pair of gaps, the gaps being located at the ends of one of the primary coils, a secondary coil surrounding one of the primary coils.

2. In an induction coil having two core parts, a pair of primary coils connected in parallel and located on the core parts, one of the core parts having very much less iron that the other core part, a secondary coil surrounding the primary coil located entirely on the smaller core part.

3. In an ignition system, a U-shaped core part and on I-shaped core part, the I-shaped core part being located between ends of the U-shaped core part, the ends of the core parts being separated by gaps, a pair of primary coils connected in parallel and located on the core parts, one of the primary coils and a secondary coil being located on the I-shaped core part.

4. In an induction coil, a primary coil and a secondary coil having a common core part, a shell formed of insulating material surrounding the coils, a pair of discs extending over the ends of the coils and the core part and closing the shell, sheet metal strips secured together for engaging the discs and the shell.

5. In an induction coil, a pair of core parts, one of the core parts located between the ends of the other core part, a primary coil and a secondary coil located on the last-named core part, a shell of insulating material surrounding the coils, a pair of discs of insulating material located between the ends of the core parts and closing the shell, two pairs of strips secured to the ends of the last-named core part for engaging the discs and the ends of the shell.

6. In an induction coil, a shell formed of insulating material surrounding the coil, a pair of discs for closing the shell, sheet metal strips secured together for engaging the discs and the shell.

7. In an induction coil, a laminated core part, a shell formed of insulating material surrounding the coil, a pair of discs for closing the ends of the shell, angular sheet metal strips for engaging the discs and the shell, a clamping means for securing the laminations of the core part and the ends of the strips together.

8. An induction coil for engine ignition systems, a pair of iron core parts, having ends in magnetic inductive relation and separated to form air gaps in the magnetic circuit between the said ends, one of said core parts having a quantity of iron materially larger than the other core part, a pair of primary coils surrounding the core parts, a secondary coil surrounding the primary coil having the smaller quantity of iron.

9. An induction coil for engine ignition systems, a pair of iron core parts having ends in magnetic inductive relation and separated to form air gaps in the magnetic circuit between the said ends, one of said core parts having a quantity of iron materially larger than the other core part, a pair of primary coils connected in parallel and surrounding the core parts, a secondary coil surrounding the primary coil on the core part having the smaller quantity of iron.

10. An induction coil for engine ignition systems, a pair of iron core parts having ends in magnetic inductive relation and separated to form air gaps in the magnetic circuit between the said ends, a pair of primary coils connected in parallel and surrounding the core parts, one of the core parts and its coil having a greater self-induction than the other core part and its coil, the secondary coil surrounding the core part the primary coil having the lesser self-induction.

11. An induction coil for engine ignition systems, a pair of iron core parts having ends in magnetic inductive relation and separated to form air gaps in the magnetic circuit between the said ends, a pair of primary coils connected in parallel and surrounding th core parts, one of the core parts and its coil having a greater self-induction than the other core part and its coil, the resistance of the primary coil having with its associated core part the lesser self-induction being of lower resistance than the other coil, a secondary coil surrounding the core part and coil having the lesser self-induction.

12. An induction coil for engine ignition systems, a pair of iron core parts having ends in magnetic and inductive relation and separated to form air gaps in the magnetic circuit between the said ends, a pair of primary coils connected in parallel and surrounding the core parts, one of the said core parts having a materially greater quantity of iron than the other of the said core parts, the primary coil surrounding the core part having a greater quantity of iron being of higher resistance than the other coil, a secondary coil surrounding the smaller core part and its associated primary coil.

In testimony whereof, I have hereunto signed my name to this specification.

MARION MALLORY.